United States Patent
Irle et al.

(10) Patent No.: US 6,255,810 B1
(45) Date of Patent: *Jul. 3, 2001

(54) INDUCTIVE ANGLE SENSOR HAVING COUPLED OSCILLATORS WITH SIMILAR INDUCTIVE RESPONSE

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,775

(22) Filed: Sep. 4, 1998

(30) Foreign Application Priority Data

Sep. 5, 1997 (DE) ............................................. 197 38 841

(51) Int. Cl.[7] ................................. G01B 7/20; G01B 7/14
(52) U.S. Cl. ................................. 324/207.17; 324/207.25; 324/236; 340/870.32; 331/65
(58) Field of Search .......................... 324/207.12, 207.15, 324/207.16, 207.25, 233, 234, 236, 239, 243; 331/65; 336/45; 340/551, 870.31, 870.32

(56) References Cited

U.S. PATENT DOCUMENTS

| 4,816,759 | 3/1989 | Ames et al. ..................... 324/233 |
|---|---|---|
| 4,940,939 | 7/1990 | Khait et al. ..................... 329/236 |

FOREIGN PATENT DOCUMENTS

| 237 448 A3 | 7/1986 | (DD) . |
|---|---|---|
| 31 31 521 A1 | 3/1983 | (DE) . |
| 35 19 215 A1 | 10/1986 | (DE) . |
| 39 23 398 C1 | 1/1991 | (DE) . |
| 42 13 866 A1 | 10/1992 | (DE) . |
| 43 01 966 C1 | 3/1994 | (DE) . |
| 43 26 766 A1 | 2/1995 | (DE) . |
| 4411759A1 | 10/1995 | (DE) . |
| 195 23 373 A1 | 1/1997 | (DE) . |
| 196 14 528 A1 | 10/1997 | (DE) . |
| 01 21 734 B1 | 3/1984 | (EP) . |
| 0 159 191 | 10/1985 | (EP) . |
| 02 87 936 A2 | 10/1988 | (EP) . |
| 2 271 186 | 4/1994 | (GB) . |

OTHER PUBLICATIONS

Tian, Guiyun, et al.: The research of a frequency–modulated displacement sensor. IN: Sensors and Actuators A55, 1996, pp. 153–156.

Primary Examiner—Jay Patidar
(74) Attorney, Agent, or Firm—Birch, Stewart, Kolasch & Birch, LLP

(57) ABSTRACT

A redundant inductive angle sensor has two LC oscillators of at least approximately identical design. By inductively coupling the oscillators, the oscillators synchronize themselves with respect to frequency and phase relationship so that undesirable mutual interference is prevented. This provides an inductive angle sensor, which is able to function even if one of the LC oscillators becomes inoperative.

5 Claims, 2 Drawing Sheets

INDUCTIVE ANGLE SENSOR HAVING COUPLED OSCILLATORS WITH SIMILAR INDUCTIVE RESPONSE

BACKGROUND OF THE INVENTION

This invention relates to an inductive angle sensor for a motor vehicle.

Potentiometers are still primarily used in motor vehicles as position sensors, specifically for determining displacement angles of motor controlled or regulated elements. Their advantage, namely that they are particularly inexpensive, is offset by the disadvantages of sensitivity to dirt accumulation and wear.

To avoid these disadvantages, increasing use is being made of non-contact angle sensors that operate according to magnetoresistive, capacitative, or inductive principles.

According to such a principle, an inductive angle sensor comprises an excitation coil with alternating current applied thereto, a magnetic field of which induces voltage in one or more receiving coils; an amplitude or phase relationship of this voltage being dependent upon a position of an inductive coupler that is movable relative to the coils.

Particularly in critical safety applications in motor vehicles, such as in determining an angular position of a throttle valve that can be adjusted by motor, redundant measuring sensors are provided for safety reasons. When a potentiometer is used as a sensor, a redundant measuring sensor can thus be designed simply as a double potentiometer.

A design of a redundant measuring inductive angle sensor is, however, problematic since a positioning of two inductive sensor systems in close proximity can result in mutual interference of the sensor system, particularly through overlapping magnetic fields generated by the exciting coils.

Consider an example of a redundant inductive angle sensor comprising two complete and independent sensor systems, up to an inductive coupling element whose position is to be sensed. If two sensor systems that are largely identical in design are used for this purpose, i.e. having two oscillators that apply alternating current of identical frequency on the exciting coils, beats occur, even at extremely low frequency deviations, in signals of the receiving coils, making evaluation of the receiving coil signals extremely difficult or even impossible.

One conceivable solution is to select extremely different oscillator frequencies so that possible difference frequencies can readily be filtered out. However, this would mean that the oscillator and the evaluation circuit, which can be advantageously combined respectively into one circuit, would have to be designed differently for the two sensor systems, which doubles development expenses. Additionally, a cost of producing two different circuits with a same number of pieces would be significantly higher than that of producing one switching circuit with twice the number of pieces.

Therefore an object of this invention is to provide a redundant inductive angle sensor that can be manufactured in a simple and most inexpensive manner and that excludes mutual interference between the sensor systems.

SUMMARY OF THE INVENTION

According to principles of this invention an inductive angle sensor for motor vehicles has two oscillators with at least approximately identical oscillation frequencies, at least one excitation coil allocated to each oscillator, at least one receiving coil allocated to each oscillator, and at least one inductive coupling element, wherein the oscillators are structured as LC oscillation circuits and are inductively coupled to each other via the exciting coils.

BRIEF DESCRIPTION OF THE DRAWINGS

The invention is described and explained in more detail below using an embodiment shown in the drawing. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings. The drawings are not necessarily to scale, emphasis instead being placed upon illustrating principles of the invention in a clear manner.

DESCRIPTION OF THE PREFERRED EMBODIMENT

Figure 1:
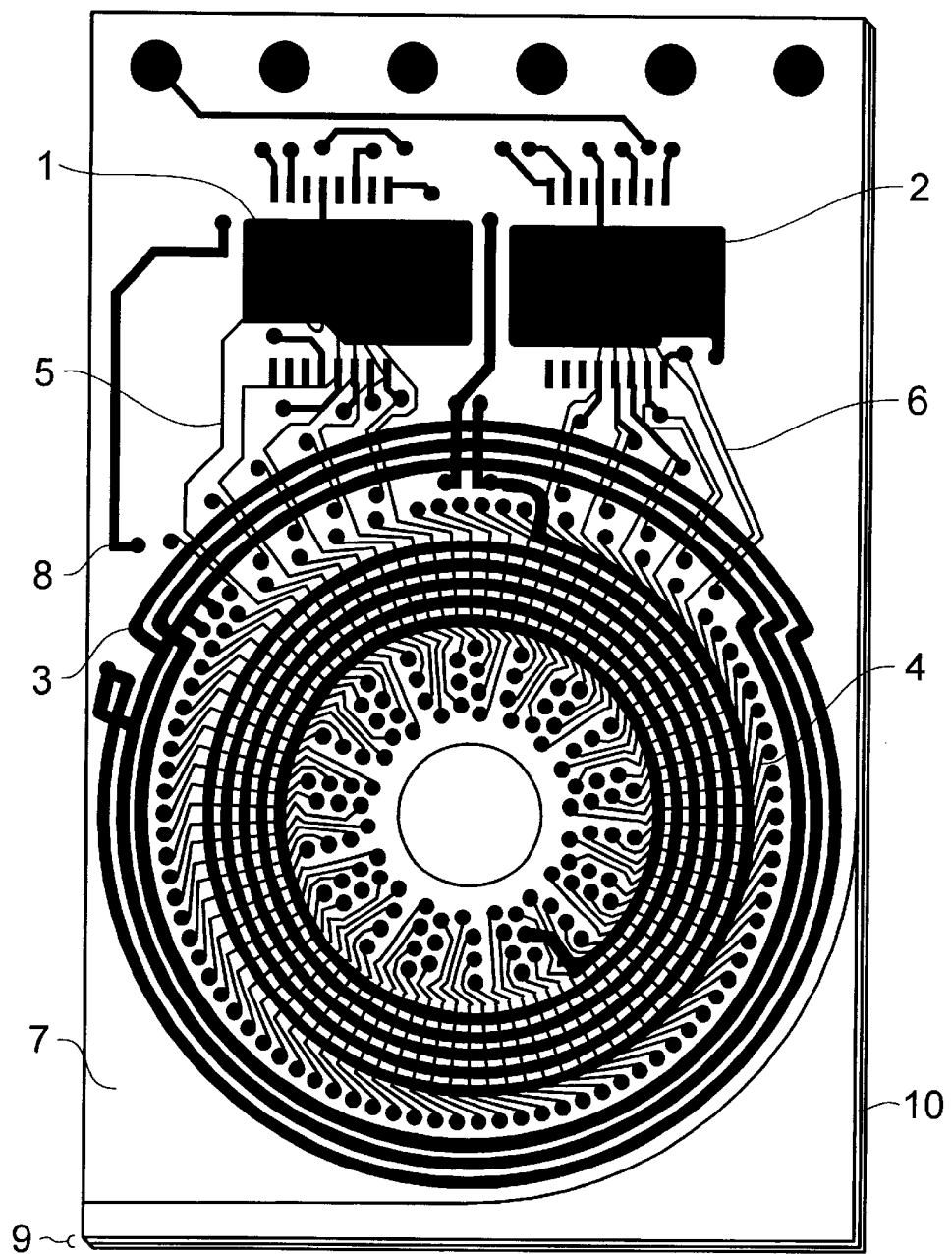
FIG. 1 shows a sketch of a layered printed circuit board for an inductive angle sensor of this invention.

FIG. 1 shows one level of a multi-layer printed circuit board 7, but not all electrical connections specified below are immediately visible in the figure because multiple connections are formed between levels 9 of the printed circuit board by feedthroughs 8 (shown as dot elements at the ends of conductor strips). However, this is insignificant for explanation of structural principles of the inductive angle sensor of the invention as described below.

Also not shown is an inductive coupling element, which may be realized as a metallic element, short circuit coil, or similar element, the angular position of which is detected by the angle sensor relative to a coil arrangement on the printed circuit board.

Figure 2:
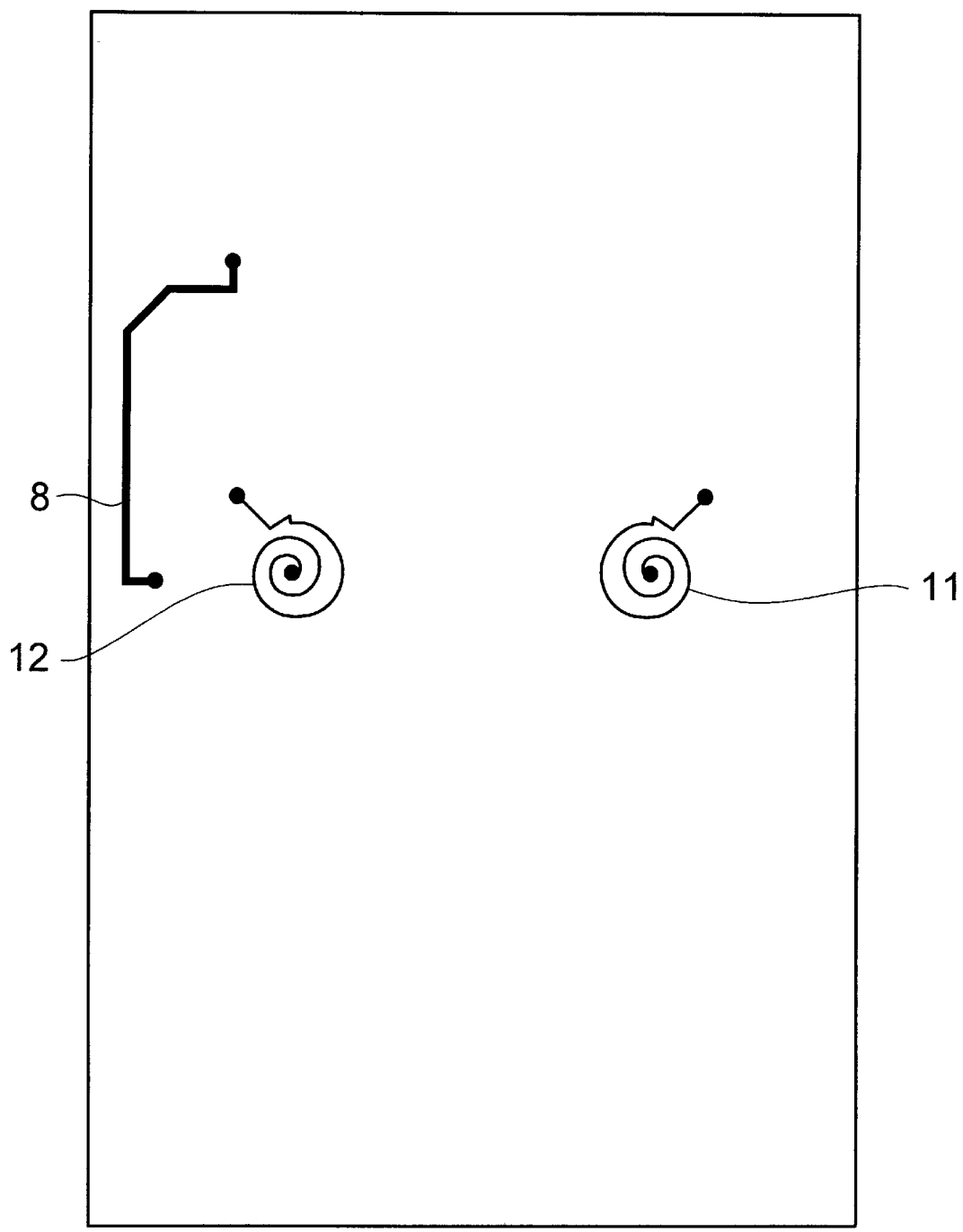
FIG. 2 shows a sketch of one of the layers of the layered printed circuit board shown in FIG. 1.

The inductive angle sensor comprises two galvanically independent but inductively coupled sensor systems. Each sensor system comprises respectively one integrated circuit 1, 2 and an exciting coil 3, 4 as well as several receiving coils 11, 12 (FIG. 2) that form periodic, or spaced, structures (e. g. meandering, triangular structures) on various printed circuit board levels within a circumference of the circular conductor strips. Coupling leads 5, 6 of these receiving coils 11, 12 (in the example shown, there are five per sensor system) lead to the circuits 1, 2, each of which contains an evaluation circuit for evaluating the receiving coil signals.

The evaluation circuit determines a precise angular position of the inductive coupling element from the various amplitude values and phase relationships of the receiving coil signals.

Also integrated with the circuits 1, 2 are oscillator circuits that apply alternating current to the exciting coils 3, 4, respectively. These oscillator circuits are inventively structured as "soft" LC oscillators, oscillation frequencies of which can be changed by external influence over a preset frequency range, without resulting in any unstable oscillating behavior or holes, or breaks, in the oscillations.

The inductive component of each LC oscillator is formed by the corresponding exciting coil 3, 4. Because of the close proximity of the exciting coils 3, 4 to each other, the oscillators experience an inductive coupling such that oscillations having identical frequencies and phases are created in both oscillators. The common oscillation frequency can diverge from the frequencies that each individual oscillator would have generated without influence.

The inductive angle sensor, therefore, solves the problem of frequency-accurate oscillators exhibiting slight variations from a predetermined base frequency. If two fixed-frequency oscillators, e. g. quartz oscillators, generate alternating fields having only approximately identical frequencies, undesirable effects occur, specifically beats of the difference frequency between the two oscillators, which makes it difficult or even impossible to evaluate the angular position of the inductive coupling element from signals output by the receiving coils.

An additional, albeit less advantageous, solution would be to provide oscillators having significantly different oscillation frequencies, so that difference frequencies are not disturbing or can be filtered out easily. However, since the circuits would have to be designed significantly differently from each other for generating the oscillations and for evaluating the signals, this solution would be considerably more expensive.

Another solution would be to provide only one oscillator that drives both exciting coils. However, this solution does not correspond to the need for creating a fully redundant angle sensor that has two sensor systems functioning independently of each other. With only one oscillator, a failure of that oscillator also means failure of the entire angle sensor.

Therefore, an angle sensor according to this invention, having two self-synchronizing oscillators, seems especially advantageous in terms of expense and operational reliability.

The idea of the invention is based on providing two oscillators that are designed as LC oscillators coupled to each other via the exciting coils. LC oscillators can be made "soft", or "flexible", i.e. capable of being tuned within a specific frequency range, without its oscillation behavior becoming unstable or having holes, or breaks, in the oscillations.

Because the two oscillators are coupled, they oscillate at the same frequency and phase relationship, whereby harmful beating can be prevented in a surprisingly easy manner.

Furthermore, it is advantageous that LC oscillators are extremely inexpensive, because the exciting coils form the inductors of the LC oscillation circuits and, also, additional frequency stabilizing devices (quartz) can be omitted.

It is also advantageous that a "tuning range" of an oscillator frequency can be preset by dimensioning oscillator components. Specifically dissipative elements of components employed make Q-factors of the oscillators so low that the oscillators still function stably within a deviation range of at least ±1 kHz of a base frequency when their oscillation frequencies are modified by external influence.

Because of the mutual coupling of the oscillators via the exciting coils, it is not only possible to, but also advantageous to, position the two exciting coils in close proximity to each other, indeed in an advantageous manner on a printed circuit board.

For this, the individual exciting coils can be structured, for example, as spiral-shaped or concentric conductor strips, and positioned concentrically with respect to each other.

Furthermore it is advantageous to provide a multi-layer printed circuit board as a printed circuit board on which the receiving coils, 11, 12 also structured as conductor strips, and circuits for generating oscillations and for evaluating signals are positioned.

It is advantageous for the two sensor systems to be inductively coupled, but galvanically separate, so that if one sensor system should fail, the second remains functional. This leads to the advantageous embodiment in which all electrical components up to the excitation and receiving coils are combined respectively into a single electrical circuit. Because the same circuit can be used twice in the structure of the inductive angle sensor of this invention, it can be manufactured in larger numbers, and thus in a particularly inexpensive manner.

The invention claimed is:

1. An inductive angle sensor for motor vehicles having two oscillators, at least one exciting coil operatively connected to each oscillator, at least one receiving coil for each oscillator, and at least one inductive coupling element, wherein the oscillators are LC oscillation circuits inductively coupled to each other via the exciting coils so that the oscillators have frequency and phase oscillations which are substantially identical.

2. An inductive angle sensor as in claim 1, wherein the Q-factor of the oscillators is low enough that the oscillators stably function within a deviation range of at least ±1 kHz of a base frequency when their oscillation frequency is modified by external influence.

3. An inductive angle sensor as in claim 1, wherein each of the respective oscillators, with the exception of its exciting coil, including its evaluation circuit, for determining a precise angular position of the inductive coupling element from data supplied thereto, connected to its receiving coil, is combined respectively into one circuit and wherein the inductive angle sensor has two identically structured circuits.

4. An inductive angle sensor as in claim 1, wherein the exciting coils, the receiving coils, and the circuits are arranged on a multi-layer printed circuit board.

5. An inductive angle sensor as in claim 4, wherein the exciting coils are respectively structured as spiral-shaped or concentric conductor strips and the exciting coils are arranged concentrically to each other.

* * * * *